United States Patent
Bornhorst

(10) Patent No.: US 8,197,095 B2
(45) Date of Patent: Jun. 12, 2012

(54) ULTRAVIOLET INFRARED FILTER

(75) Inventor: James Bornhorst, De Soto, TX (US)

(73) Assignee: Production Resource Group, LLC, New Windsor, NY (US)

( * ) Notice: Subject to any disclaimer, the term of this patent is extended or adjusted under 35 U.S.C. 154(b) by 286 days.

(21) Appl. No.: 12/118,556

(22) Filed: May 9, 2008

(65) Prior Publication Data

US 2009/0279194 A1 Nov. 12, 2009

(51) Int. Cl.
*F21V 9/04* (2006.01)
*F21V 9/06* (2006.01)

(52) U.S. Cl. .................. 362/293; 362/583; 359/361

(58) Field of Classification Search .......... 362/583, 362/293, 297–307; 359/350, 351, 353, 355, 359/359–361
See application file for complete search history.

(56) References Cited

U.S. PATENT DOCUMENTS

| | | | | |
|---|---|---|---|---|
| 1,837,091 A * | 12/1931 | Adams | .......................... | 362/301 |
| 3,686,940 A * | 8/1972 | Kockott | ...................... | 73/150 R |
| 3,737,226 A * | 6/1973 | Shank | .............................. | 355/67 |
| 3,757,101 A * | 9/1973 | Semotan | ............................ | 362/2 |
| 4,535,394 A * | 8/1985 | Dugre | ............................ | 362/231 |
| 4,747,645 A * | 5/1988 | Rudzki | ............................ | 356/51 |
| 4,974,136 A * | 11/1990 | Noori-Shad et al. | .......... | 362/293 |
| 5,408,398 A * | 4/1995 | Chang | ............................ | 362/293 |
| 5,798,805 A * | 8/1998 | Ooi et al. | ........................ | 349/10 |
| 5,844,638 A * | 12/1998 | Ooi et al. | ........................ | 349/10 |
| 5,938,307 A * | 8/1999 | Hamada et al. | ................. | 353/38 |
| 5,982,497 A * | 11/1999 | Hopkins | ........................ | 356/419 |
| 6,135,598 A * | 10/2000 | Hamada et al. | ................. | 353/38 |
| 6,326,998 B1 * | 12/2001 | Palum | ............................ | 348/342 |
| 6,585,399 B2 * | 7/2003 | Kreutzer et al. | ................ | 362/341 |
| 7,063,423 B2 * | 6/2006 | Fujimori et al. | ................ | 353/55 |
| 2003/0173503 A1* | 9/2003 | Tocci et al. | ................... | 250/216 |
| 2004/0207997 A1* | 10/2004 | Stewart et al. | .................. | 362/31 |
| 2005/0122721 A1* | 6/2005 | Hori | ................................ | 362/268 |
| 2005/0265027 A1* | 12/2005 | Wu et al. | ........................ | 362/293 |
| 2006/0158898 A1* | 7/2006 | Cheng et al. | .................. | 362/583 |
| 2007/0211468 A1* | 9/2007 | Allegri | ........................... | 362/268 |

* cited by examiner

*Primary Examiner* — Mark Consilvio
(74) *Attorney, Agent, or Firm* — Law Office of Scott C. Harris, Inc.

(57) ABSTRACT

A two-dimensional wedge shaped UV and IR filter is formed by or substantially same size pieces of glass forming a two-dimensional wedge. The wedge reflects radiation in four different directions.

19 Claims, 2 Drawing Sheets

ULTRAVIOLET INFRARED FILTER

BACKGROUND

In stage lighting devices, one object is to obtain as much output lighting effect as possible from the light. The optical systems often produce large amounts of light. The projected light includes visible part but also includes large amount of heat therein.

FIG. 1 illustrates a prior art attempted solution to this problem. The light source 100 may produce a light output of 700 W or more output.

The light beam is coupled to an ultraviolet/infrared filter, which rejects the passage of at least one of IR or UV components therethrough. The output light 120 is cleansed, as much as possible, of non-visible light. This light may be further processed by light altering elements, e.g., the gobo 130.

It was found by the inventor, however, that the FIG. 1 system causes rejected energy to pass back to the lamp 100.

SUMMARY

The present application describes a UV IR filter that addresses many of these problems.

An embodiment discloses a pyramid shaped radiation filter.

DETAILED DESCRIPTION

Figure 1:
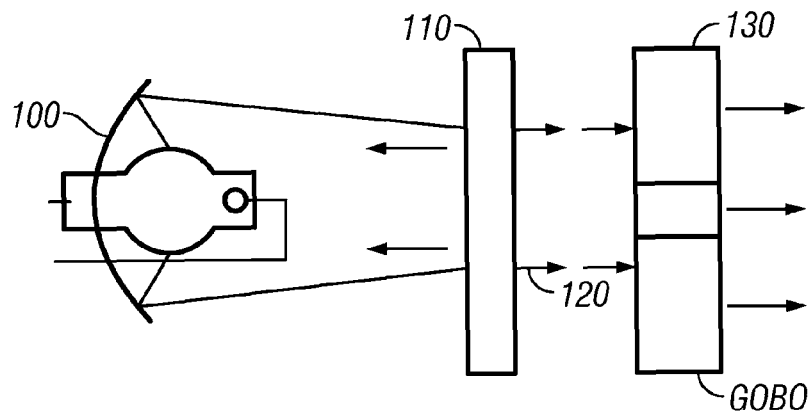
FIG. 1 shows a prior art embodiment of a radiation filter.
Figure 2:
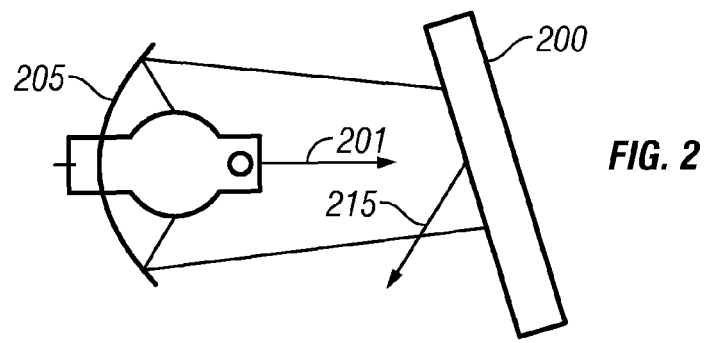
FIG. 2 shows a first embodiment where radiation is reflected at an angle relative to the optical axis.

An embodiment shown in FIG. 2 addresses this issue by angling the IR filter 200 relative to the lamp 205 at an angle that is neither perpendicular nor parallel to the axis 201 of the light beam. The light output from the lamp, therefore, is sent in a direction shown as 215, rather than being sent back to the lamp.

This system effectively couples the energy to different location (i.e., not back to the lamp). However, this arrangement may takes up extra space due to the angled filter 200. Also, it requires that the energy be directed to another location, and hence that other location needs to be capable of handling the significant heat output.

Figure 3:
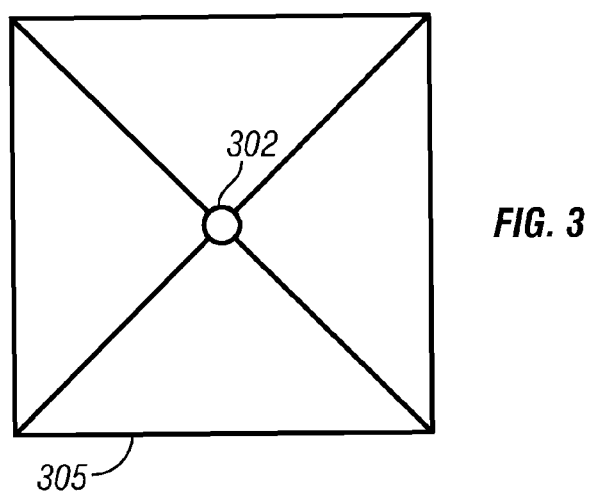
FIG. 3 shows an embodiment of a multisided radiation filter shaped like a pyramid.

Another embodiment, shown in FIG. 3 uses a two-dimensional wedge formed of four pieces of radiation reflecting material to form a pyramidal shaped filter. FIG. 3 shows the pyramidal filter formed from four pieces of cold mirror material, e.g, glass. In the embodiment, each piece of glass is in the shape of a triangle, and there is a small hole 302 in the middle where the triangles come together in the "shadow" of the bulb. FIG. 3 shows how the combination of these triangular forms is put together in the shape of a two-dimensional wedge. Each portion of the glass such as 305 is a flat piece of glass, but each portion directs the light in a different direction.

Figure 4:
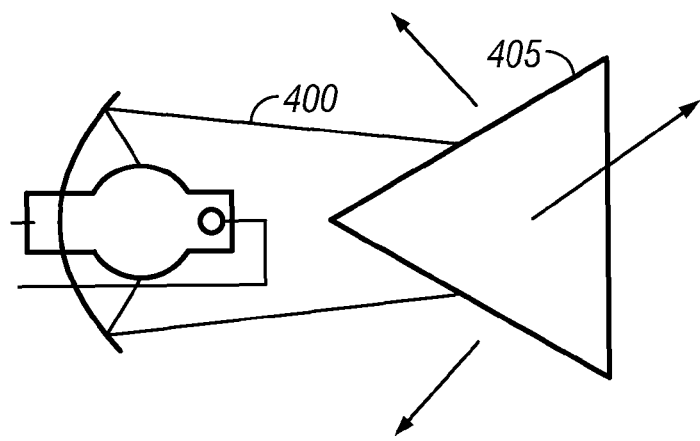
FIG. 4 shows how the pyramid filter reflects light.

FIG. 4 illustrates how the light beam 400 is impinging on this two-dimensional wedge, so that one portion 405 directs the light beam in a first direction, another portion in another direction. The double wedge formed of four pieces of filter material forms four separate angular directions of directing the light, thereby dividing up the energy into four different directions. Each piece of material preferably forms the same angle with the optical axis, but in a different orientation to reflect the light in a different direction.

Another embodiment may use a cone of glass as the filter to reflect the light in multiple different directions.

Another embodiment may use a number of flat pieces of glass (e.g., 16 or 32 triangular shaped pieces) which approximate a cone, so that the cone of light intersects the cone of glass.

Opening 302 may be located in the center of the reflector, at a location of the shadow of the lamp. This also allows the filter to expand and contract.

In one embodiment, the wedge may form a 10° horizontal angle. The UV IR filters may be tuned for angle of incidence for where the cone of light intersects the pyramid. Another embodiment may use an average angle of incidence of 12°.

Figure 5:
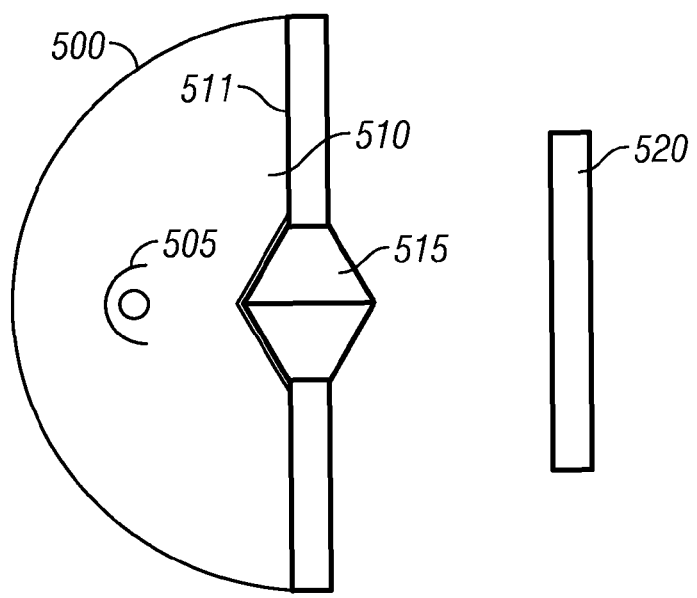
FIG. 5 shows an embodiment where the light is sealed within a thermal area.

FIG. 5 illustrates an embodiment having a sealed area 500 including the lamp and reflector assembly 505. A thermal barrier 510 is formed by a thermally isolating shield 511, and the pyramid shaped filter 515. The optical components 520 downstream of the lamp receive light, but are isolated from the heat caused by the light beam.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other angle pyramids can be used, e.g., any angle between 10 and 25 degrees with reference to the horizontal might be usable. Also, an embodiment discloses a pyramid which has 4 directions of reflecting the light, a 4 sided structure. However, any number of sides can be used including 5, 8, 16 or any other number of sides. More sides creates more directions of reflection.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

What is claimed is:

1. A radiation filter device comprising:
a first planar radiation filter part, defining a plane extending in a first direction, and reflecting incoming radiation in a second direction that is based on said first direction;
a second planar radiation filter part, defining a plane extending in a third direction different than said first or second directions, and reflecting radiation in a different direction than either said third direction or said second direction, said second planar radiation filter part coupled to said first radiation part, and forming an integral structure therewith, where each of the first and second planar radiation filter parts have ultra-violet and infra-red filtering characteristics, and where both of said first and second planar radiation parts have identical amounts of said ultra-violet and infra-red filtering characteristics, and allowing ultra-violet and infra-red filtered light to pass through said filter parts;

a lamp emitting light, and inner surfaces defining a hole at an apex of the wedge, where said apex faces said lamp to be illuminated by said lamp in a way that light from said lamp passes through said apex, and said hole is at an area of a shadow created by said lamp in a direction of facing.

2. A device as in claim 1, further comprising third and fourth planar radiation filter parts, said third planar radiation filter part extending in a different direction than either said first or second planar radiation parts, and said fourth planar radiation filter part extending an different direction than any of said first, second, third or fourth planar radiation parts and each of said third and fourth planar radiation parts have the same ultra-violet and infra-red filtering characteristics.

3. A radiation filter device comprising:
a first planar radiation filter part, defining a plane extending in a first direction, and reflecting incoming radiation in a second direction that is based on said first direction;
a second planar radiation filter part, defining a plane extending in a third direction different than said first or second directions, and reflecting radiation in a different direction than either said third direction or said second direction, said second planar radiation part coupled to said first radiation part, and forming an integral structure therewith;
third and fourth planar radiation filter parts, said third planar radiation filter part extending in a different direction than either said first or second planar radiation parts, and said fourth planar radiation filter part extending an different direction than any of said first, second, third or fourth planar radiation parts,
wherein said first, second, third and fourth planar radiation filter parts are coupled to one another in the shape of a two dimensional wedge and where each of said first, second, third and fourth planar radiation parts have identical amounts of ultra-violet and infra-red filtering characteristics and allowing ultra-violet and infra-red filtered light to pass through said filter parts;
a lamp emitting light, and
inner surfaces defining a hole at an apex of the wedge, where said apex faces said lamp to be illuminated by said lamp in a way that light from said lamp passes through said apex, and said hole is at an area of a shadow created by said lamp in a direction of facing.

4. A device as in claim 3, wherein each of said first, second, third and fourth planar radiation filter parts are substantially the same size and shape.

5. A device as in claim 3, wherein each of said first, second, third and fourth planar radiation parts are formed from the same material with identical filtering characteristics.

6. A radiation filter device in a lighting device, comprising:
a lighting part, creating a light output along a path;
a first planar radiation filter part, defining a plane extending in a first direction, and reflecting incoming radiation along said path in a second direction that is based on said first direction; and
a second planar radiation filter part, defining a plane extending in a third direction different than said first or second directions, and reflecting radiation in a different direction than either said third direction or said second direction, said second planar radiation part coupled to said first radiation part forming a pointed area where an outside part of the pointed area forming an obtuse angle relative to other radiation filter parts, faces said lighting part, wherein said radiation filter parts filter against both of ultraviolet and infrared radiation more than they filter visible light, further comprising inner surfaces defining a hole at an apex of the pointed area, where said apex faces said lamp to be illuminated by said lighting part in a way that light from said lighting part passes through said hole, and said hole is at an area of a shadow created by said lighting part in a direction of facing.

7. A device as in claim 6, further comprising a plurality of additional radiation filter parts, each extending in a different direction.

8. A device as in claim 6, wherein said different directions are substantially the same angle relative to a reference plane, but a different orientation relative to said reference plane, forming a pyramid-shaped structure, and where an outside surface of the pyramid structure, with each of said radiation filter parts forming obtuse angles with the other radiation filter parts.

9. A device as in claim 8, wherein where each of said first, second, third and fourth planar radiation parts have identical amounts of ultra-violet and infra-red filtering characteristics.

10. A device, comprising:
a plurality of radiation filters, each having substantially the shape of a triangle, each of said radiation filters coupled to one another along only a portion of an edge thereof, and each defining a plane which extends in a different direction than each other radiation filter, where each of said plurality of radiation filters are formed to ultra-violet and infra-red filtering characteristics, and where both of said first and second planar radiation parts have identical amounts of said ultra-violet and infra-red filtering characteristics and allowing ultra-violet and infra-red filtered light to pass through said filter parts, further comprising a lamp emitting light, and further comprising inner surfaces defining a hole at an apex of the wedge, where said apex faces said lamp to be illuminated by said lamp in a way that light from said lamp passes through said apex, and said hole is at an area of a shadow created by said lamp in a direction of facing.

11. A device as in claim 10, wherein there are four of said radiation filters, and said four of said radiation filters collectively form a pyramid shape.

12. A device as in claim 10, wherein said filters each extend over the same direction relative to a reference, but at a different orientation.

13. A device as in claim 12, wherein said direction is between 10 and 15 degrees relative to a plane that is perpendicular to an optical axis.

14. a device as in claim 10, wherein each of the first and second planar radiation filter parts are formed from the same material that has all its filtering characteristics identical to one another.

15. A device, comprising:
a lamp, emitting light;
a plurality of radiation filters, each having substantially the shape of a triangle, each of said radiation filters coupled to one another along only a portion of an edge thereof, and each defining a plane which extends in a different direction than each of the other radiation filters , and said edge portions come together forming an acute angle on an outside surface at the edge portions, and forming an obtuse angle on the inside surface of the edge portions, and wherein said plurality of radiation filters are coupled to one another in a way where an apex is formed at a location where said triangles come together, said apex on said outside surface facing and spaced from said lamp to be illuminated by said lamp in a way that light from said lamp passes through said apex, and further comprising inner surfaces defining a hole at said apex where the triangles come together, where light from said lamp passes through said hole, and said hole is at an area of a shadow created by said lamp in a direction of facing.

16. A device as in claim 15, where each of said plurality of radiation filters are formed to have ultra-violet and infra-red filtering characteristics, and where both of said first and second planar radiation parts have identical amounts of said ultra-violet and infra-red filtering characteristics.

17. A device, comprising:
a plurality of radiation filters, each having substantially the shape of a triangle, each of said radiation filters coupled to one another along only a portion of an edge thereof, and each defining a plane which extends in a different direction than each of the other radiation filters, wherein said radiation filters prevent more of at least one of ultraviolet or infrared from passing, relative to visible light, further comprising a lamp emitting light, and further comprising inner surfaces defining a hole at an apex of the wedge, where said apex faces said lamp to be illuminated by said lamp in a way that light from said lamp passes through said apex, and said hole is at an area of a shadow created by said lamp in a direction of facing.

18. A device as in claim 17, wherein each of said radiation filters are formed to have all filtering characteristics which are identical.

19. A device as in claim 17, wherein each of the radiation filter parts are formed from the same material that has all its filtering characteristics identical to one another.

* * * * *